US005657400A

United States Patent [19]
Granfors et al.

[11] Patent Number: 5,657,400
[45] Date of Patent: Aug. 12, 1997

[54] AUTOMATIC IDENTIFICATION AND CORRECTION OF BAD PIXELS IN A LARGE AREA SOLID STATE X-RAY DETECTOR

[75] Inventors: Paul R. Granfors; Jean Claude Morvan, both of Milwaukee, Wis.

[73] Assignee: General Electric Company, Milwaukee, Wis.

[21] Appl. No.: 381,161

[22] Filed: Jan. 31, 1995

[51] Int. Cl.⁶ .................................................. G06K 9/40
[52] U.S. Cl. .................... 382/254; 382/132; 250/208.1
[58] Field of Search .......................... 382/132, 254, 382/261, 262, 264, 274, 275, 312; 250/208.1, 559.1; 358/443, 448, 463, 461

[56] References Cited

U.S. PATENT DOCUMENTS

| | | | |
|---|---|---|---|
| 4,287,536 | 9/1981 | Wiggins | 358/464 |
| 4,314,281 | 2/1982 | Wiggins et al. | 382/272 |
| 4,920,428 | 4/1990 | Lin et al. | 358/461 |
| 5,047,863 | 9/1991 | Pape et al. | 348/247 |
| 5,120,950 | 6/1992 | Roziere et al. | 250/208.1 |
| 5,499,114 | 3/1996 | Compton | 358/483 |
| 5,514,865 | 5/1996 | O'Neil | 250/208.1 |

*Primary Examiner*—Leo Boudreau
*Assistant Examiner*—Chris Kelley
*Attorney, Agent, or Firm*—B. Joan Haushalter; John H. Pilarski

[57] ABSTRACT

A method for identifying and correcting bad pixels in an x-ray image produced by a large area solid state x-ray detector is disclosed. Initially, each bad pixel is identified. An appropriate correction scheme is then selected from a predetermined list. A correction code is then assigned to each bad pixel, the correction code corresponding to the selected correction scheme. The correction code is stored in a pixel-correction memory, and the correction code for each pixel is read during imaging. Finally, each bad pixel value found during the correction code reading is replaced using the selected correction scheme, and can be immediately displayed.

10 Claims, 2 Drawing Sheets

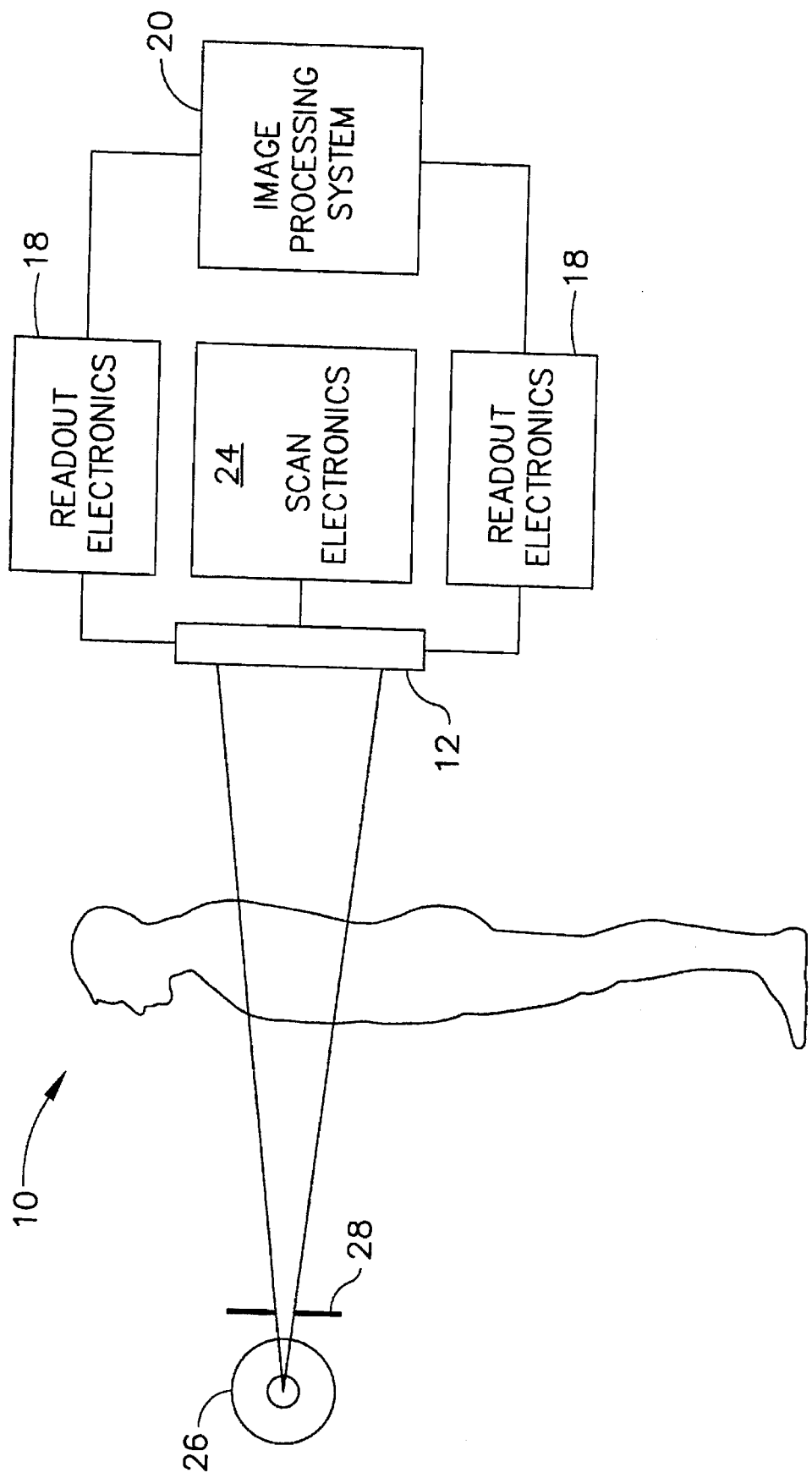

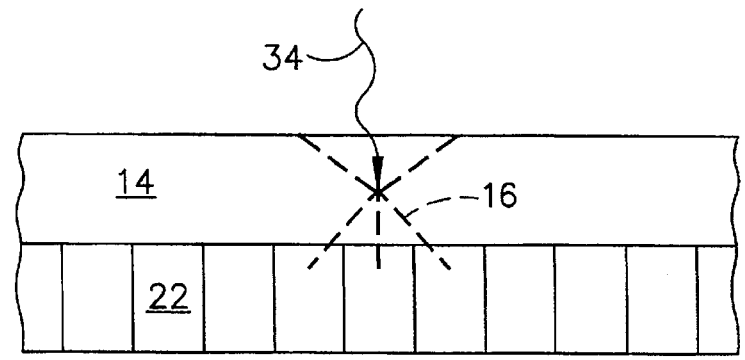
FIG. 2A
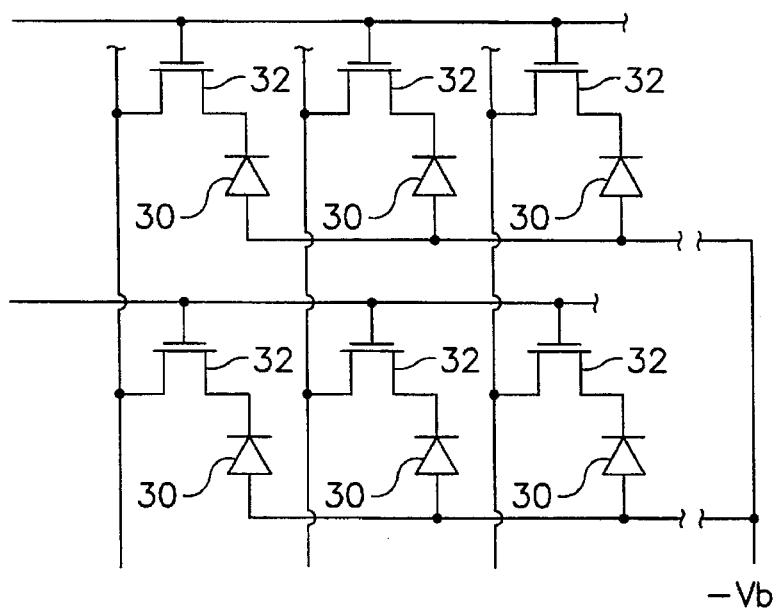
FIG. 2B
| NW | N | NE |
| --- | --- | --- |
| W | 34 | E |
| SW | S | SE |
FIG. 3

AUTOMATIC IDENTIFICATION AND CORRECTION OF BAD PIXELS IN A LARGE AREA SOLID STATE X-RAY DETECTOR

TECHNICAL FIELD

The present invention relates to x-ray detectors and, more particularly, to bad pixel identification and correction in large area solid state x-ray detectors.

BACKGROUND ART

Large area solid state x-ray detectors are currently being developed in the x-ray art. Such a detector typically comprises a scintillating layer in contact with an array of photodiodes, organized in rows and columns, each with an associated FET switch. The scintillator converts x-ray photons to light photons. The array of photodiodes converts light photons to electrical signals. The photodiodes are initially charged by connecting them to a known stable voltage through the FET switches. Subsequently, the photodiodes are isolated by turning the FETs off. Upon exposure to x-rays, the scintillator produces light which discharges each photodiode in proportion to the x-ray exposure at the position of the diode. The diodes are then recharged by again connecting them to the known stable voltage. The charge used to restore the diode to its initial voltage is measured by a sensing circuit, and the value is digitized and stored. The resulting array of digital values comprises an x-ray image of the distribution of x-rays impinging on the detector.

Proposed x-ray detectors made with this technology will contain a large number, as many as several million, photodetector elements. In the course of manufacturing such an array, inevitably, a fraction of the elements will be defective. Fortunately, the use of perfect detector is not required for medical x-ray imaging. The minimum size of objects that can be clearly seen in a medical image is determined by the modulation transfer function (MTF) of the imaging system. For a large area solid state detector the factors contributing to MTF degradation are lateral spread of light photons and of secondary x-ray photons in the scintillator and the finite size of the pixel. The thickness and structure of the scintillator and the pixel size are designed so that the MTF of the imaging system is adequate to view the smallest objects of interest in an image. In particular, the pixel size is chosen so that objects of interest in the image spread their signal over more than one pixel. Therefore, provided the bad pixels are not aggregated in sizable clusters, the loss of information due to bad pixels is negligible. However, because the signal from a defective pixel is either independent of x-ray exposure or depends on x-ray exposure in a way that is much different from that of surrounding pixels, a defective pixel will have a value that stands out from its neighbors. If bad pixel values were left unaltered in the displayed image, they would interfere with the visualization of the rest of the image.

It is necessary, then, to have a means for identifying bad pixels and a means for changing bad pixel values to ones that will blend in with neighboring good pixel values.

SUMMARY OF THE INVENTION

The present invention provides such a means for identifying and correcting for bad pixels in a large area solid state x-ray detector, whereby bad pixel values are replaced by values that blend in with neighboring good pixels in a displayed image.

In accordance with one aspect of the present invention, a method for identifying and correcting bad pixels in an x-ray image produced by a large area solid state x-ray detector is disclosed. Initially, each bad pixel is identified. An appropriate correction scheme is then selected from a predetermined list. A correction code is then assigned to each bad pixel, the correction code corresponding to the selected correction scheme. The correction code is stored in a pixel-correction memory, and the correction code for each pixel is read during imaging. Finally, each bad pixel value found during the correction code reading is replaced using the selected correction scheme, and can be immediately displayed.

Accordingly, it is an object of the present invention to provide a means for identifying bad pixels in a large area solid state x-ray detector. It is a further object of the present invention to provide a means for correcting the values of these bad pixels in an x-ray image. Other objects and advantages of the invention will be apparent from the following description, the accompanying drawings and the appended claims.

BRIEF DESCRIPTION OF THE DRAWINGS

FIG. 1 is a block diagram of an x-ray imaging system;

FIG. 2A illustrates detail of a solid state detector array shown in FIG. 1;

FIG. 2B illustrates a portion of the photo detector array of FIG. 2A; and

FIG. 3 illustrates location of a pixel to be corrected, as related to its nearest and next-nearest neighbors.

DETAILED DESCRIPTION OF THE PREFERRED EMBODIMENTS

A large area solid state x-ray detector imaging system 10 is illustrated in FIG. 1. The imaging system comprises a detector 12 which includes a scintillator 14, as shown in FIG. 2A. The scintillator 14 converts x-ray photons 34 to light photons 16. Light photons 16 are converted to electrical signals by photodetectors 22. An array of photodetectors is typically made of thin film materials, such as amorphous silicon. Readout electronics 18 then convert the resultant analog signal to a digital signal that can be processed, stored, and displayed using well known image processing techniques and electronics, as illustrated by image processing system block 20. In FIG. 1, the detector 12 receives x-rays provided by x-ray source 26 through collimator 28, and attenuated by the subject of the x-ray examination, such as a human patient.

Continuing with FIGS. 1 and 2A, in order to reduce the amount of readout electronics 18 required for the system 10, photo detector elements 22 are constructed such that they can integrate and store the analog signal until it can be processed by the readout electronics 18. Scanning electronics 24 provide control for the photo detector elements 22.

FIG. 2B illustrates a portion of the array of photo detector elements 22 of FIG. 2A. The array elements are organized in rows and columns with each element consisting of a photodiode 30 and a thin film field effect transistor 32. The cathode of the diode 30 is connected to the source of the transistor 32 and the anodes of all the diodes 30 are connected to a negative bias voltage (−Vb). The gates of the transistors 32 in a row are connected together and this row electrode (row) is connected to the scanning electronics 24 of FIG. 1. The drains of the transistors in a column are connected together and this column electrode (column) is connected to the readout electronics 18 of FIG. 1. The photo diode is a large area diode with an associated capacitance.

Proposed x-ray imagers made with this technology will contain a large number, as many as several million, photo-detector elements. In the course of manufacturing such an array, inevitably, a fraction of the elements will be defective. Fortunately, the use of a perfect detector is not required for medical x-ray imaging. The minimum size of objects that can be clearly seen in a medical image is determined by the MTF of the imaging system. For a large area solid state detector the factors contributing to MTF degradation are lateral spread of light photons and of secondary x-ray photons in the scintillator and the finite size of the pixel. The thickness and structure of the scintillator and the pixel size are designed so that the MTF of the imaging system is adequate to view the smallest objects of interest in an image. In particular, the pixel size is chosen so that objects of interest in the image spread their signal over more than one pixel. Therefore, provided the bad pixels are not aggregated in sizable clusters, the loss of information due to bad pixels is negligible. However, because the signal from a defective pixel is either independent of x-ray exposure or depends on x-ray exposure in a way that is much different from that of surrounding pixels, a defective pixel will have a value that stands out from its neighbors. If bad pixel values were left unaltered in the displayed image, they would interfere with the visualization of the rest of the image. For this reason, the present invention provide for identification of bad pixels and for changing of bad pixel values to ones that will blend in with neighboring good pixel values.

One method of identifying bad pixels is to find those whose offset (defined as the signal obtained in the absence of x-ray exposure) or gain (defined as the signal obtained per unit of x-ray exposure) lie outside acceptable limits. Because of non-uniformities in the manufacturing process and differences in the readout timing, for different regions of the detector, pixels will have differences in offset and gain. In order to obtain an acceptable image, these differences must be compensated for. Typically an offset value is subtracted from each original, uncorrected pixel value, and the result is multiplied by a gain correction factor. The range of offset values and gain correction factors is necessarily limited. Thus a pixel will be identified as bad if its offset and/or gain lies outside the range that can be corrected with the available readout electronics.

An image of pixel offsets is created by averaging together several images obtained in the absence of x-ray exposure. Pixels whose offsets are either above the maximum correctable offset or below the minimum correctable offset are identified as bad pixels. An image of gain coefficients is created by averaging together several images obtained with uniform x-ray exposure and then subtracting the offset image. This resulting image will have a value at each pixel that is proportional to that pixel's gain. In principle, pixels whose gain coefficients are above a maximum correctable gain or below a minimum correctable gain could be identified as pixels with bad gain.

A complicating factor with the outlined approach for finding pixels with bad gain is caused by the fact that it is not possible to make the x-ray exposure perfectly uniform over the area of the detector and that differences in gain in the readout electronics associated with different parts of the image may cause further non-uniformities. Such complications can be circumvented by noting that x-ray field non-uniformity and readout electronics gain differences produce variations that vary relatively slowly with position in the image while bad pixels are very localized. One can take advantage of this fact by applying a filter to the image that acts differently on high and low spatial frequency variations.

One example of such a filter is a median filter with a suitably small kernel (e.g. about 5×5). If one applies such a filter to the image, sharply localized variations, such as caused by bad pixels, will be filtered out, whereas the smoothly varying background will be relatively little affected. If one then subtracts the filtered image from the original, good pixels will have small absolute values in the resulting image, while bad pixels will have larger absolute values. Bad pixels can then be identified as those which have values above a suitably defined maximum or below a suitably defined minimum in this image.

Usually the outlined procedure is sufficient for identifying all of the bad pixels in a detector. However, it may be necessary to identify pixels with bad gain by repeating the above procedure using images with more than one level of x-ray exposure. This would be necessary, for example, to identify a pixel with a non-linear response whose signal might fortuitously lie in the acceptable range at a single exposure level. It is also possible that pixels may be bad for reasons other than bad offset or bad gain (for example, a pixel may have a signal that changes too slowly with changes in exposure). Such pixels need to be identified using an appropriate test and added to the list of bad pixels.

After the bad pixels have been identified, they can be "corrected" in accordance with the present invention. The goal of bad pixel correction is to find a value for a bad pixel location that will "blend in" with those of neighboring good pixels in a displayed image. The solution described herein, according to the present invention, can be implemented to allow immediate display of the corrected image after x-ray exposure and will work for any pixel which has at least one good nearest or next-nearest neighbor.

The bad pixel correction mechanism of the present invention assigns a bad pixel the value of one of its neighbors or the average of the values of two of its neighbors. The assignment that is used depends on which of the neighboring pixels are good.

Referring now to FIG. 3, there is shown a pixel 34, illustrated as the central square. Also shown are the nearest pixel neighbors N, S, E, and W, of the pixel 34, and its next-nearest pixel neighbors NW, NE, SW, and SE. If the central pixel 34 were a bad pixel, its value would be assigned one of the following pixel values or combinations of pixel values, based on the designations shown in FIG. 3: (E+W)/2; (N+S)/2; (NW+SE)/2; (NE+SW)/2; N; S; E; W; NE; NW; SE; SW.

The first combination listed would preferentially be used. However, if either of the pixels to be used for calculating the new pixel value were also bad, the next combination would be used, and so forth. Hence, the first choice to use for the new pixel value is an average of two nearest neighbors, then an average of two next-nearest neighbors, then a single nearest neighbor, and finally a single next-nearest neighbor.

A correction code for each bad pixel is determined in a calibration procedure performed prior to imaging. First, all of the bad pixels are identified as described above. Then, for each bad pixel the nearest neighbors and next-nearest neighbors are analyzed to determine which of them are good. Finally, a code is assigned based on the list of twelve possibilities shown above. In one particular embodiment, a thirteenth code is assigned to each good pixel. In this embodiment, a code for every pixel in the image is stored in a pixel-correction memory. Alternatively, in another embodiment, to reduce memory size, only the bad pixel locations and associated codes would be stored.

During imaging, the code for each pixel is read from the pixel-correction memory. If the code indicates that the pixel is good, the pixel value is passed without alteration. If the code is one of those indicating a bad pixel, then, based on the code, the appropriate combination of nearest and next-nearest pixel values is calculated and the bad pixel value is replaced by this combination. This operation is performed in such a way that the corrected image is available for immediate display.

The invention has been described in detail with particular reference to certain preferred embodiments thereof, but it will be understood that modifications and variations can be effected within the spirit and scope of the invention.

We claim:

1. A method for identifying and correcting bad pixels in an x-ray image produced by a large area solid state x-ray detector, comprising the steps of:

identifying as bad each pixel with a gain lying outside a range that can be corrected with available readout electronics, including acquiring an average of multiple images without x-ray exposure, acquiring an average of multiple images with a flat-field x-ray exposure, subtracting the average image without exposure from the average image with exposure, removing a low spatial frequency background from the subtracted image, and identifying bad pixels in the resulting image as those with relatively larger absolute values;

selecting an appropriate correction from a predetermined list;

assigning a correction code to each bad pixel, the correction code corresponding to the selected correction;

storing the correction code in a pixel correction memory;

reading the correction code for each pixel during imaging;

replacing each bad pixel value, as indicated by reading the correction code, using the selected correction, for immediate display.

2. A method as claimed in claim 1 wherein the step of identifying each bad pixel comprises the step of identifying as bad a pixel with an offset lying outside a range that can be corrected with available readout electronics.

3. A method as claimed in claim 2 wherein the step of identifying as bad a pixel with an offset lying outside a range that can be corrected comprises the steps of:

acquiring an average of multiple images without x-ray exposure; and identifying pixels in this image lying outside the range that can be corrected with available readout electronics.

4. A method as claimed in claim 1 wherein the step of removing a low spatial frequency background comprises the steps of:

filtering the subtracted image with a suitable smoothing filter; and subtracting the filtered image from the image prior to filtering.

5. A method as claimed in claim 4 wherein the smoothing filter comprises a median filter.

6. A method as claimed in claim 1 wherein the predetermined list comprises replacement of the bad pixel by various combinations of neighboring pixel values.

7. A method as claimed in claim 6 wherein the various combinations comprise an average of two nearest neighboring pixel values, an average of two next-nearest neighboring pixel values, a single nearest neighboring pixel value, and a single next-nearest neighboring pixel value.

8. A method as claimed in claim 7 wherein the step of selecting an appropriate correction comprises the steps of:

analyzing nearest and next-nearest neighboring pixels of the bad pixel to determine a set of good pixels;

selecting a correction from the predetermined list, based on pixels in the set of good pixels.

9. A method as claimed in claim 1 further comprising the step of assigning a good code to every good pixel.

10. A method as claimed in claim 9 further comprising the step of storing the good code in the pixel correction memory.

* * * * *